(12) United States Patent
Ishii et al.

(10) Patent No.: US 10,981,477 B2
(45) Date of Patent: Apr. 20, 2021

(54) CAR SEAT

(71) Applicant: TACHI-S Co., Ltd., Tokyo (JP)

(72) Inventors: Atsushi Ishii, Tokyo (JP); Masayuki Taguchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/729,658

(22) Filed: Dec. 30, 2019

(65) Prior Publication Data

US 2020/0247288 A1  Aug. 6, 2020

(30) Foreign Application Priority Data

Feb. 1, 2019  (JP) .............................. JP2019-016967

(51) Int. Cl.
*B60N 2/58* (2006.01)

(52) U.S. Cl.
CPC ......... *B60N 2/5883* (2013.01); *B60N 2/5875* (2013.01); *B60N 2/5891* (2013.01)

(58) Field of Classification Search
CPC .. B60N 2/5883; B60N 2/5875; B60N 2/5891; B60N 2/5816; B60N 2/58
USPC ................. 297/218.1, 218.2, 218.3
See application file for complete search history.

(56) References Cited

U.S. PATENT DOCUMENTS

| | | | | |
|---|---|---|---|---|
| 6,345,865 B1 * | 2/2002 | Ashida | ....................... | B62J 1/00 297/195.1 |
| 6,378,949 B1 * | 4/2002 | Maeda | .................. | D03D 15/08 297/452.56 |
| 2002/0020992 A1 * | 2/2002 | Kanuma | ................ | B60R 21/235 280/730.2 |
| 2013/0009416 A1 * | 1/2013 | Wenzel | ..................... | D05C 7/04 296/1.08 |
| 2014/0339843 A1 * | 11/2014 | Wenzel | ................... | B60R 13/02 296/1.08 |
| 2015/0042117 A1 * | 2/2015 | Wenzel | ..................... | D05B 1/06 296/1.08 |
| 2017/0196286 A1 | 7/2017 | Ito et al. | | |
| 2017/0282766 A1 | 10/2017 | Sekino et al. | | |
| 2018/0001807 A1 * | 1/2018 | Kamata | .................. | B68G 7/052 |
| 2018/0170225 A1 * | 6/2018 | Izukawa | .............. | B60N 2/5883 |
| 2019/0009699 A1 * | 1/2019 | Ohtsu | .................. | B60N 2/5883 |
| 2019/0143860 A1 * | 5/2019 | Ohtsu | .................. | B60N 2/5891 297/452.58 |
| 2020/0247287 A1 * | 8/2020 | Iacovone | ............. | B60N 2/5657 |
| 2020/0331176 A1 * | 10/2020 | Yokota | ..................... | B60N 2/90 |

FOREIGN PATENT DOCUMENTS

| | | |
|---|---|---|
| JP | 2016-19699 A | 2/2016 |
| JP | 2017-177993 A | 10/2017 |

* cited by examiner

*Primary Examiner* — Mark R Wendell
(74) *Attorney, Agent, or Firm* — Fitch, Even, Tabin & Flannery, LLP

(57) ABSTRACT

In a car seat configured to cover a surface of a urethane pad by a trim cover, the trim cover is formed by sewing up a plural number of trim cover members with each other by chain stitch sewing, and by joining a surface on the back side of a portion where the plural number of the trim cover members are sewn up with each other by chain stitch sewing to a flat surface of the surface of the urethane pad by an adhesive.

8 Claims, 8 Drawing Sheets

CAR SEAT

CROSS-REFERENCE TO RELATED APPLICATIONS

This application claims the benefit of Japanese Patent Application No. 2019-016967 filed Feb. 1, 2019, the contents of which is incorporated herein by reference in its entirety.

BACKGROUND

The present invention relates to a car seat, and relates specifically to a car seat including a trim cover formed by sewing.

A car seat is configured to cover the surface of a urethane pad that is a cushion member by a trim cover, and this trim cover is formed by sewing a plural number of trim cover members. As a method for sewing the plural number of trim cover members, for example, Japanese Unexamined Patent Application Publication No. 2017-177993 describes that two of the trim cover members to be sewn up with each other are superposed, and are sewn up with each other by plural rows of seams extending in parallel along the sewing line of two of the trim cover members having been superposed.

Also, Japanese Unexamined Patent Application Publication No. 2016-019699 describes a method for superposing and sewing up with two of textiles each other in a state where a tape member is further superposed.

According to such method for sewing the trim cover members as described in Japanese Unexamined Patent Application Publication No. 2017-177993, because two of the trim cover members are superposed each other and are sewn up with each other by plural rows of the seams, it is hard to subject the superposed portion to fashionable chain stitch sewing that is used for sewing clothes.

On the other hand, although Japanese Unexamined Patent Application Publication No. 2016-019699 describes superposing two of textiles and sewing up the same by a sewing method called "flat seamer", in superposing and sewing such thick fabrics as a vehicular trim cover, it is possible that the end surface of the fabrics shifts from the needle point because the thick fabrics having been superposed are pressed by a vertically moving pressing tool of a sewing machine, a meandering gap is generated in the sewing part, and poor appearance occurs.

SUMMARY

The present invention is to provide a car seat that solves the problems of the prior arts described above and allows to subject such thick fabrics as a vehicular trim cover to fashionable chain stitch sewing.

In order to solve the problems described above, according to an aspect of the present invention, in a car seat configured to cover a surface of a urethane pad by a trim cover, the trim cover is formed by sewing up a plural number of trim cover members with each other by chain stitch sewing, and a surface on the back side of a portion where the plural number of the trim cover members are sewn up with each other by chain stitch sewing is joined to a flat surface of the surface of the urethane pad by an adhesive and is formed.

Also, in order to solve the problems described above, according to an aspect of the present invention, in a car seat configured to cover a surface of a urethane pad by a trim cover, the trim cover being formed by sewing up a plural number of trim cover members with each other, the trim cover forms a flat seam by joining a back side of a portion where the plural number of the trim cover members are sewn up with each other to a flat surface of the surface of the urethane pad by an adhesive, and a portion of the trim cover where the flat seam is formed is formed by sewing up the plural number of the trim cover members with each other by chain stitch sewing.

Further, in order to solve the problems described above, according to an aspect of the present invention, in a car seat configured to cover a surface of a urethane pad by a trim cover, portions in the vicinity of ends of a plural number of trim cover members are joined to each other by lockstitch sewing in the trim cover, and the plural number of the trim cover members are sewn up with each other by chain stitch sewing along a portion joined by the lockstitch sewing in a state of being opened to the left and right around the portion joined by the lockstitch sewing to form the trim cover.

According to the present invention, it is possible to subject such thick fabrics as a vehicular trim cover to fashionable chain stitch sewing, and to add decorativeness to the sewn-up portion of the trim cover.

Also, according to the present invention, it is possible to provide a car seat having a flat seam structure where the flat surface of the urethane pad is covered by the trim cover whose sewn-up portion is provided with decorativeness without forming a concave surface in the urethane pad that is a cushion member of a backing.

These features and advantages of the invention will be apparent from the following more particular description of preferred embodiments of the invention, as illustrated in the accompanying drawings.

DESCRIPTION OF THE PREFERRED EMBODIMENTS

An aspect of the present invention is to allow, in a car seat configured to cover the surface of the urethane pad by the trim cover, to subject such thick fabrics as a vehicular trim cover to fashionable chain stitch sewing and to add decorativeness to the sewn-up portion of the trim cover by forming the trim cover by sewing up a plural number of the trim cover members with each other by chain stitch sewing, and joining a surface on the back side of a portion where the plural number of the trim cover members are sewn up with each other by chain stitch sewing to a flat surface of the surface of the urethane pad by an adhesive and forming the surface.

Also, an aspect of the present invention is to allow, in a car seat configured to cover the surface of the urethane pad by the trim cover, to subject such thick fabrics as a vehicular trim cover to fashionable chain stitch sewing and to add decorativeness to the sewn-up portion of the trim cover by joining the portions in the vicinity of ends of a plural number of the trim cover members to each other by lockstitch sewing in the trim cover, and the trim cover is formed by sewing up the plural number of the trim cover members with each other by chain stitch sewing along a portion joined by the lockstitch sewing in a state of being opened to the left and right around the portion joined by the lockstitch sewing.

Also, an aspect of the present invention is to allow, in a car seat configured to cover the surface of the urethane pad by the trim cover formed by sewing up a plural number of the trim cover members, to provide a car seat having a flat seam structure where the flat surface of the urethane pad is covered by the trim cover whose sewn-up portion is provided with decorativeness without forming a concave surface in the urethane pad that is a cushion member of a backing by the trim cover forming a flat seam by joining a back side of a portion where the plural number of the trim cover members are sewn up with each other to a flat surface of the surface of the urethane pad by an adhesive, and a portion of the trim cover where the flat seam is formed is formed by sewing up the plural number of the trim cover members with each other by chain stitch sewing.

Below, embodiments of the present invention will be explained using the drawings.

First Embodiment

The first embodiment of a car seat will be explained using FIG. 1 to FIG. 8, the first embodiment of a car seat allowing to subject such thick fabrics as a vehicular trim cover to fashionable chain stitch sewing and to add decorativeness to the sewn-up portion of the trim cover.

Figure 1:
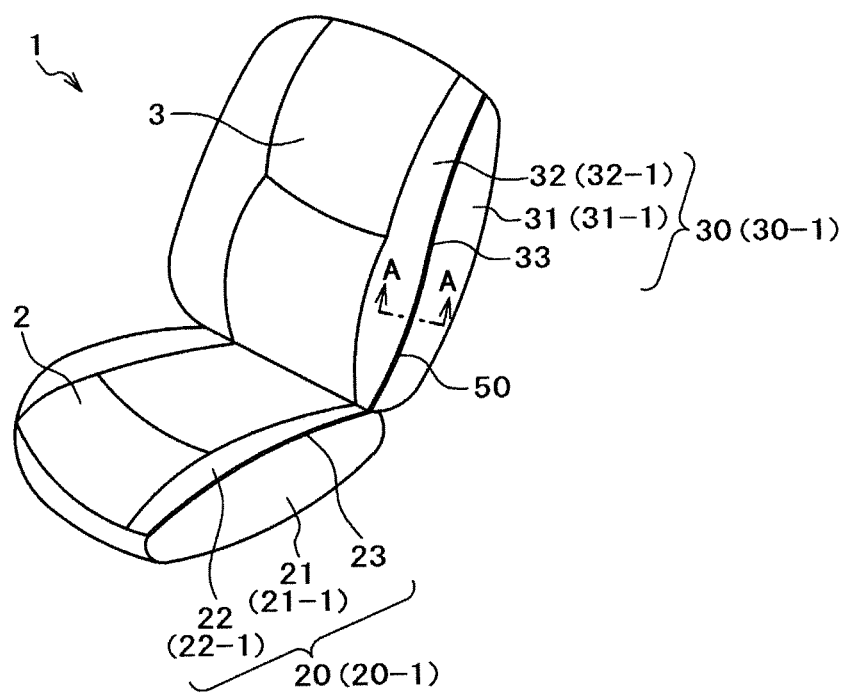
FIG. 1 is a perspective view of a car seat related to a first embodiment of the present invention.

FIG. 1 shows appearance of a car seat 1 related to the present embodiment. The car seat 1 related to the present embodiment includes a seat cushion 2 and a seatback 3, a passenger sitting on the seat cushion 2, the passenger sitting on the seat cushion 2 resting the passenger's back on the seatback 3.

The surface of the seat cushion 2 is covered by a trim cover 20, and trim cover members 21, 22 forming the trim cover 20 are sewn up with each other by a flat seam section 23. In a similar manner, the surface of the seatback 3 is also covered by trim cover members 31, 32 forming a trim cover 30, and the trim cover members 31, 32 are sewn up with each other by a flat seam section 33.

Figure 2:
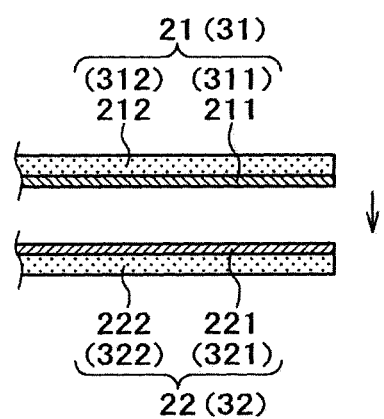
FIG. 2 is a cross-sectional view of a trim cover member showing a state before superposing two of the trim members of a car seat related to the first embodiment of the present invention.

FIG. 2 shows the trim cover members 21 (31) and 22 (32) of a state before being sewn up with each other. The trim cover member 21 (31) is formed by making a urethane layer 212 (312) having cushionability adhere to a surface skin layer 211 (311) on the front surface side. The surface skin layer 211 (311) is formed of leather, needle work, woven fabric, non-woven fabric, resin, and the like. In a similar manner, the trim cover member 22 (32) is also formed by making a urethane layer 222 (322) having cushionability adhere to a surface skin layer 221 (321) on the front surface side. The surface skin layer 221 (321) is formed of leather, needle work, woven fabric, non-woven fabric, resin, and the like.

Figure 3:
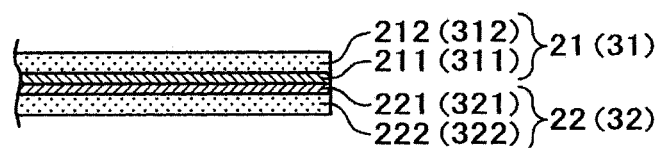
FIG. 3 is a cross-sectional view of a trim cover member showing a state of superposing two of the trim members of a car seat related to the first embodiment of the present invention.

FIG. 2 shows a state where the surface skin layers 211 (311) and 221 (321) on the front surface side of the trim cover members 21 (31) and 22 (32) are configured to face each other, the surface skin layer 211 (311) being located on the front surface side. In this state, the urethane layers 212 (312) and 222 (322) having cushionability are directed outward each other. The trim cover member 21 is moved in the arrow direction in this state, and the trim cover members 21 and 22 are superposed so that the surface skin layers 211 (311) and 221 (321) contact each other as shown in FIG. 3.

Figure 4:
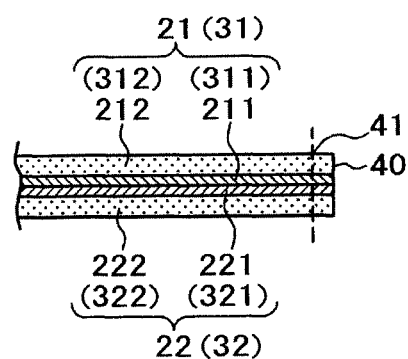
FIG. 4 is a cross-sectional view of a trim cover member showing a state where two of the trim members of a car seat related to the first embodiment of the present invention are sewn with each other at the vicinity of the ends in a state of being superposed.

Next, as shown in FIG. 4, a lockstitch sewing portion 41 close to an end 40 of the trim cover members 21 (31) and 22 (32) having been superposed is lockstitch-sewn for being sewn up with each other using a lockstitch sewing machine along the end 40, the lockstitch sewing machine executing sewing by a needle thread and a bobbin thread using one piece of needle, the bobbin thread being unreeled from a bobbin.

Here, the dimension from the end 40 to the lockstitch sewing portion 41 is set to 1.5±1 mm, the lockstitch sewing being executed at the lockstitch sewing portion 41.

Figure 5:
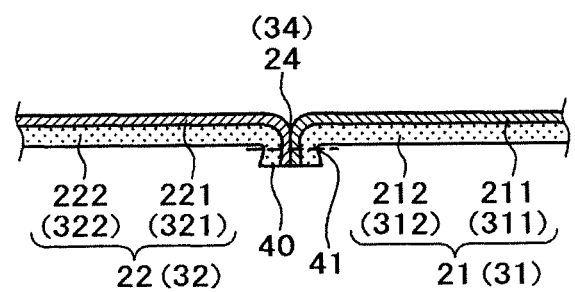
FIG. 5 is a cross-sectional view of a trim cover member showing a state where two of the trim members of a car seat related to the first embodiment of the present invention are superposed and sewn with each other, and the trim cover member is thereafter spread with overlapping being torn off.

FIG. 5 shows a state where the trim cover members 21 (31) and 22 (32) sewn up with each other by lockstitch sewing are opened to the left and right around a sewn-up portion 24 (34). Here, if the distance from the lockstitch sewing portion 41 to the end 40 is too short, there is a risk that the lockstitch sewing portion 41 having been sewn may be broken when slightly strong tension is applied to the trim cover members 21 (31) and 22 (32) opened to the left and right.

Figure 6:
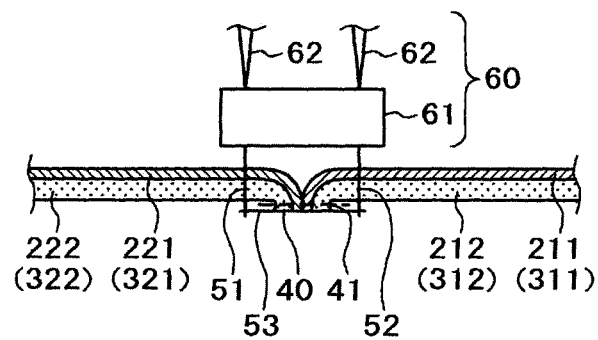
FIG. 6 is a cross-sectional view of a trim cover member showing a state where the trim cover members spread with overlapping being torn off are sewn by an apparel sewing machine after two of the trim members of a car seat related to the first embodiment of the present invention are superposed and sewn up with each other.

FIG. 6 shows a state where the trim cover members 21 (31) and 22 (32) having been sewn up are chain-stitch-sewn around the sewn-up portion 24 (34) using a lock (chain stitch) sewing machine that sews knit raw material and the like using plural needles and plural threads in a state of being opened to the left and right. In FIG. 6, the reference sign 60 expresses a mechanism including a pressing tool 61 and a needle 62 of the lock sewing machine. Further, although a configuration of including two of the needles 62 is shown in FIG. 6, the present invention is not limited to it, and there may be plural needles 62, namely four for example.

By lifting and lowering the pressing tool 61 and two of the needles 62 while delivering the trim cover members 21 (31) and 22 (32) opened to the left and right around the sewn-up portion 24 (34) by a feed mechanism of the lock sewing machine not illustrated, fashionable chain stitch sewing (flat-double stitch) can be executed by a bobbin thread 53 and warp threads 51, 52. Thus, decorativeness can be added to the sewn-up portion of the trim cover member. Here, a hot-melt thread is used as the bobbin thread 53. This hot-melt thread is formed of such material that its outer peripheral portion is molten excepting the center portion of the thread when the heat is applied.

Here, when the distance from the lockstitch sewing portion 41 to the end 40 is too long, the portion from the lockstitch sewing portion 41 to the end 40 comes to protrude long downward. When the trim cover members 21 (31) and 22 (32) sewn up with each other are opened to the left and right in such state and are set to an apparel sewing machine, the sewn-up portion 24 (34) comes to protrude high beyond the portion of the trim cover members 21 (31) and 22 (32) in the periphery of the sewn-up portion 24 (34). As a result, chain stitch sewing by an apparel sewing machine cannot be executed normally, and increases the possibility of defective product.

In order to prevent such circumstance, it is preferable to set the distance from the end 40 to the lockstitch sewing portion 41 to 1.5±1 mm as described above. Thus, flat-double stitch working where the chain-stitch-sewn portion is comparatively flat with respect to its peripheral portion can be executed.

Figure 7A:
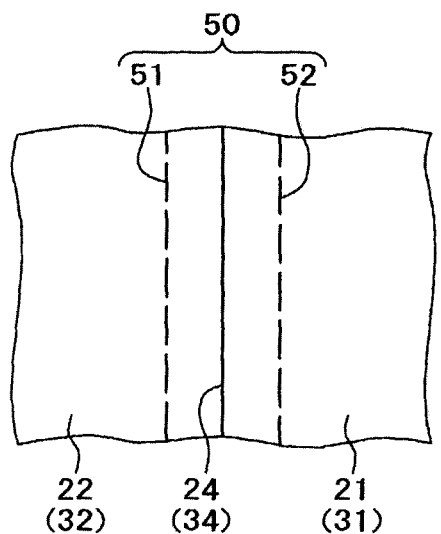
FIG. 7A is a plan view on the front surface side of a trim cover showing a state where the trim cover members of a car seat related to the first embodiment of the present invention have been sewn by an apparel sewing machine.

FIG. 7A shows a state of, viewing from the side of the front surface of the trim cover 20 (30), a state where a state the trim cover members 21 (31) and 22 (32) are subjected to chain stitch sewing 50 along the sewn-up portion 24 (34) and the trim cover 20 (30) is subjected to flat-double stitch working. To the side of the front surface, the warp threads 51 and 52 having executed the chain stitch sewing 50 appear. In a state of being sewn up with each other by the lockstitch sewing portion 41, the trim cover members 21 (31) and 22 (32) are further sewn up with each other by the chain stitch sewing 50. Thus, the portion where fashionable chain stitch sewing is executed appears at the front surface after the trim cover members 21 (31) and 22 (32) are tied to each other with sufficient strength as the trim cover 20 (30).

Figure 7B:
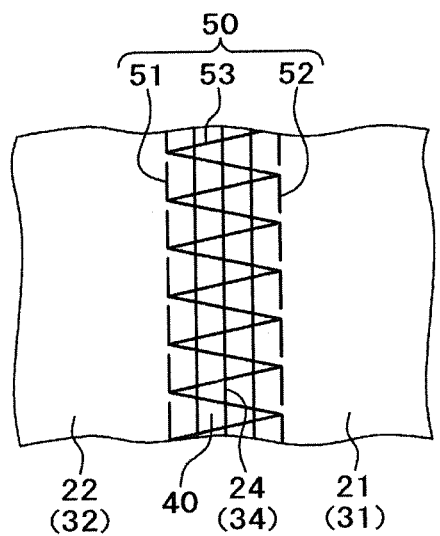
FIG. 7B is a plan view on the back surface side of a trim cover showing a state where the trim cover members of a car seat related to the first embodiment of the present invention have been sewn by an apparel sewing machine.

FIG. 7B shows a state where the trim cover 20 (30) subjected to flat-double stitch working is viewed from the front side of the trim cover 20 (30). Such state is shown that a portion including the end 40 from the sewn-up portion 24 (34) is subjected to the chain stitch sewing 50 by the warp threads 51, 52 and the bobbin thread 53.

Figure 8:
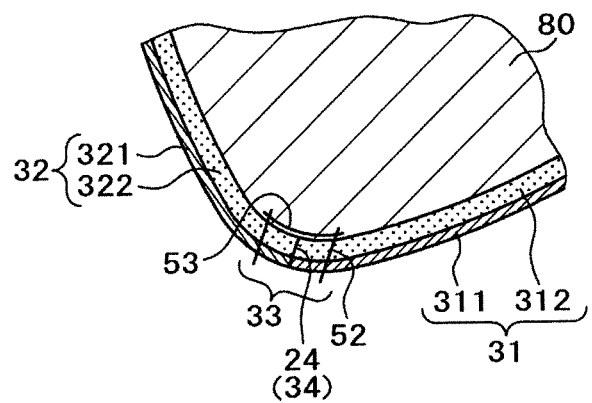
FIG. 8 is a cross-sectional view of a urethane pad and a trim cover showing a state where the surface of the urethane pad that is a cushion material is covered by a trim cover of a car seat related to the first embodiment of the present invention.

FIG. 8 shows a cross-sectional view of a state where the trim cover members 31 and 32 configuring the trim cover 30 on the seat back 3 side out of the trim covers 20 (30) formed by sewing up the trim cover members 21 (31) and 22 (32) with each other are superposed on a urethane pad 80. Because the distance from the lockstitch sewing portion 41 to the end 40 is short in the sewn-up portion 34, when the trim cover members 31 and 32 sewn up with each other are superposed on the urethane pad 80, interference of the protruded portion from the lockstitch sewing portion 41 to the end 40 and the urethane pad 80 is negligibly small, and the sewn-up portion 34 of the trim cover members 31 and 32 becomes generally flat. Therefore, even when a groove is not formed on the urethane pad 80 side where the sewn-up portion 34 abuts upon, protrusion of the sewn-up portion of the trim cover members 31 and 32 becomes inconspicuous.

When the sewn-up portion 34 and its periphery are heated in this state, hot-melt of the bobbin thread 53 is molten. By cooling this molten hot-melt, the urethane layer 312 of the trim cover member 31 and the urethane layer 322 of the trim cover member 32 contacting the bobbin thread 53 are adhered to the urethane pad 80.

Thus, even when a concave part is not formed in the urethane pad 80 in the seat cushion 2 and the seatback 3 respectively, the flat seam sections 23 and 33, in which the sewn-up portion of the trim cover members 21 (31) and 22 (32) forming the trim covers has a flat shape in the flat seam sections 23 and 33, can be formed.

When the passenger repeats sitting and seat leaving on/from the car seat 1, it is possible that the trim cover members 31 and 32 shift from the urethane pad 80 and local crinkle and looseness occur. However, according to the present embodiment, local crinkle and looseness can be prevented because the urethane layer 312 of the trim cover member 31 and the urethane layer 322 of the trim cover member 32 are adhered to the urethane pad 80 by the hot-melt of the bobbin thread 53.

Although the embodiment described above has been explained with respect to an example of application to the seat cushion 2 and the seatback 3, the embodiment described above can also be applied to other portions such as a headrest and an armrest for example not illustrated.

According to the present embodiment, it is possible to subject such thick fabrics as a vehicular trim cover to fashionable chain stitch sewing, and to add decorativeness to the sewn-up portion of the trim cover.

Also, according to the present embodiment, it is possible to provide a car seat formed with a flat seam where the flat surface of the urethane pad is covered by the trim cover whose sewn-up portion is provided with decorativeness without forming a concave surface in the urethane pad that is a cushion member of a backing.

Second Embodiment

In the first embodiment, such example has been explained that fashionable chain stitch sewing is executed after two of the trim cover members are lockstitch-sewn in a superposed state and two of the trim cover members are tied to each other. On the other hand, in the present embodiment, such example of subjecting two of the trim cover members to fashionable chain stitch sewing without executing tying by lockstitch sewing will be explained using FIG. 9 to FIG. 12.

Figure 9:
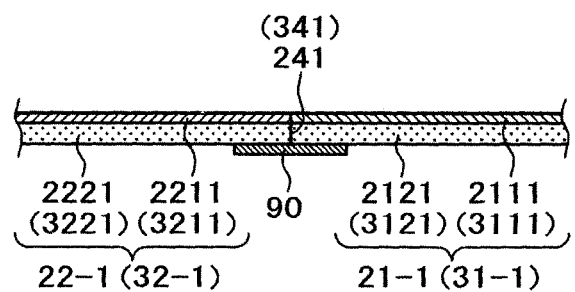
FIG. 9 is a cross-sectional view of a trim cover member showing a state where a portion where two of the trim cover members of a car seat related to a second embodiment of the present invention are made to abut upon each other is connected by an adhesive tape.

In the present embodiment, first, as shown in FIG. 9, the distal end portions of two of trim cover members 21-1 (31-1) and 22-1 (32-1) are abutted upon each other, and at both sides of this abutment portion 241 (341), urethane layers 2121 (3121) and 2221 (3221), which are backside of the trim cover members 21-1 (31-1) and 22-1 (32-1), are adhered to each other by an adhesive tape 90.

Figure 10:
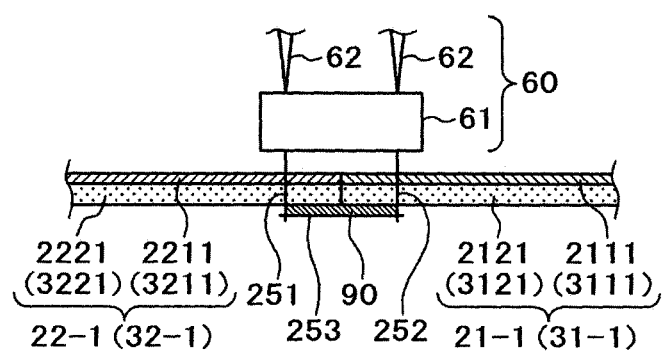
FIG. 10 is a cross-sectional view of a trim cover member showing a state where a portion where two of the trim cover members of a car seat related to the second embodiment of the present invention are made to abut upon each other and is connected by an adhesive tape is sewn by an apparel sewing machine.

Next, as shown in FIG. 10, a portion made to adhere to each other by the adhesive tape 90 is chain-stitch-sewn using an apparel sewing machine. In FIG. 10, the reference sign 60 expresses a mechanism including a pressing tool 61 and a needle 62 of the apparel sewing machine. By lifting and lowering the pressing tool 61 and two of the needles 62 while sending out the trim cover members 21-1 (31-1) and 22-1 (32-1) in a state of being adhered to each other by the adhesive tape 90 by a feed mechanism of the apparel sewing machine not illustrated, fashionable chain stitch sewing can be executed by a bobbin thread 253 and warp threads 251, 252. Thus, decorativeness can be added to the sewn-up portion of the trim cover member. Here, a hot-melt thread is used as the bobbin thread 253. This hot-melt thread is formed of such material that its outer peripheral portion is molten excepting the center portion of the thread when the heat is applied.

Figure 11A:
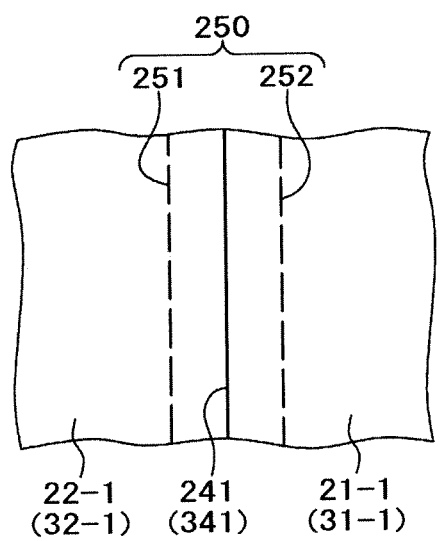
FIG. 11A is a plan view on the front surface side of a trim cover showing a state where the trim cover members of a car seat related to the second embodiment of the present invention have been sewn by an apparel sewing machine.

FIG. 11A shows a drawing showing a state of viewing, from the side of the front surface of the trim cover 20-1 (30-1), a state where the trim cover members 21-1 (31-1) and 22-1 (32-1) are subjected to chain stitch sewing 250 to form a trim cover 20-1 (30-1) along the distal end portions abutted upon each other. The trim cover members 21-1 (31-1) and 22-1 (32-1) are sewn up with each other by the chain stitch sewing 250. Thus, the portion where fashionable chain stitch sewing is executed appears at the front surface after the trim cover members 21-1 (31-1) and 22-1 (32-1) are tied to each other with sufficient strength as a trim cover member that configures the trim cover 20-1 (30-1).

Figure 11B:
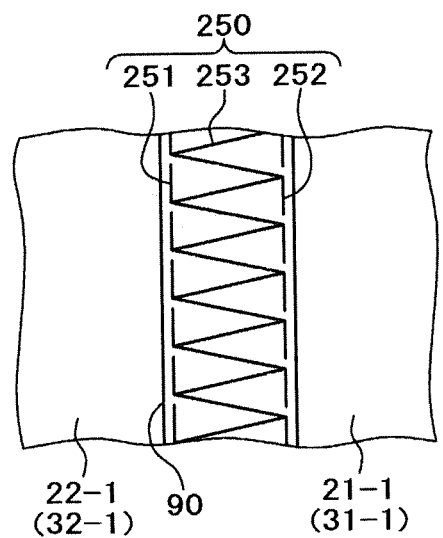
FIG. 11B is a plan view on the back surface side of a trim cover showing a state where the trim cover members of a car seat related to the second embodiment of the present invention have been sewn by an apparel sewing machine.

FIG. 11B shows a drawing showing the trim cover 20-1 (30-1) subjected to the chain stitch sewing 250 as viewed from the back surface side. Such state is shown that a portion where the trim cover members 21-1 (31-1) and 22-1 (32-1) are made to adhere to each other by the adhesive tape 90 is subjected to the chain stitch sewing 250 by the warp threads 251, 252 and the bobbin thread 253.

Figure 12:
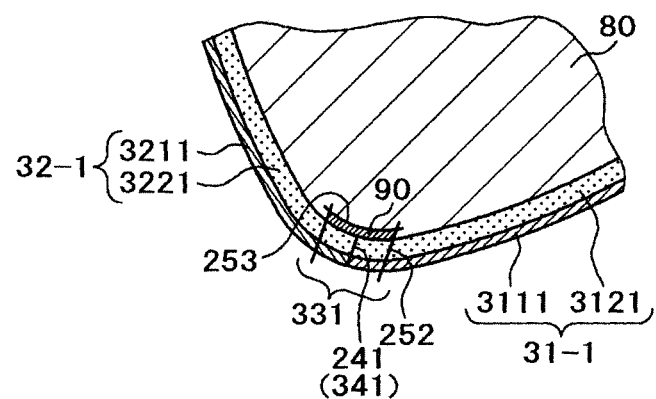
FIG. 12 is a cross-sectional view of a urethane pad and a trim cover showing a state where the surface of the urethane pad that is a cushion material is covered by a trim cover of a car seat related to the second embodiment of the present invention.

FIG. 12 shows a cross-sectional view of a state where the trim cover members 31-1 and 32-1 configuring the trim cover 30-1 on the seat back 3 side out of these trim cover members 21-1 (31-1) and 22-1 (32-1) sewn up with each other are superposed on the urethane pad 80. When these trim cover members 31-1 and 32-1 sewn up with each other are superposed on the urethane pad 80 in a sewn-up portion 331, the sewn-up portion 331 of the trim cover members 31-1 and 32-1 becomes generally flat. Therefore, even when a groove is not formed on the urethane pad 80 side where the sewn-up portion 331 abuts upon, protrusion of the sewn-up portion of the trim cover members 31-1 and 32-1 becomes inconspicuous.

When the sewn-up portion 331 and its periphery are heated in this state, hot-melt of the bobbin thread 253 is molten. By cooling this molten hot-melt, the urethane layer 3121 of the trim cover member 31-1 and the urethane layer 3221 of the trim cover member 32-1 contacting the bobbin thread 253 are made to adhere to the urethane pad 80.

Thus, even when a concave part is not formed in the urethane pad 80 in the seat cushion 2 and the seatback 3 respectively, a flat seam (corresponding to 23 and 33 of FIG. 1 in the first embodiment), in which the sewn-up portion of the trim cover members 21-1 (31-1) and 22-1 (32-1) has a flat shape in the flat seam, can be formed.

When the passenger repeats sitting and seat leaving on/from the car seat 1, it is possible that the trim cover members 31-1 and 32-1 shift from the urethane pad 80 and local crinkle and looseness occur. However, according to the present embodiment, local crinkle and looseness can be prevented because the urethane layer 3121 of the trim cover member 31-1 and the urethane layer 3221 of the trim cover member 32-1 are adhered to the urethane pad 80 by the hot-melt of the bobbin thread 253.

Although the embodiment described above has been explained with respect to an example of application to the seat cushion 2 and the seatback 3, the embodiment described above can also be applied to other portions namely a headrest and an armrest for example not illustrated.

According to the present embodiment, it is possible to subject such thick fabrics as a vehicular trim cover to fashionable chain stitch sewing, and to add decorativeness to the sewn-up portion of the trim cover.

Also, according to the present embodiment, it is possible to provide a car seat formed with a flat seam on the surface of the urethane pad by covering the urethane pad by the trim cover having decorativeness at the sewn-up portion, the flat seam being flat without unevenness.

Third Embodiment

In the first embodiment, such example has been explained that, after two of the trim cover members are lockstitch-sewn in a state of being superposed with each other and are tied to each other, flat-double stitch working is executed by fashionable chain stitch sewing. On the other hand, according to the present embodiment, such example will be explained that flat-quad stitch working is executed by fashionable chain stitch sewing in a state of superposing a tape along a portion where two of the trim cover members are lockstitch-sewn and are tied to each other.

In the present embodiment, the steps until two of the trim cover members are lockstitch-sewn with each other in a state of being superposed with each other and are tied to each other are same to the steps explained using FIG. 2 to FIG. 5 in the first embodiment.

Figure 13:
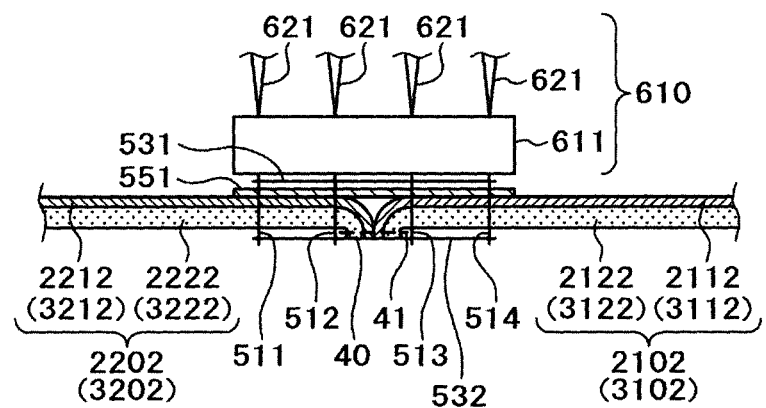
FIG. 13 is a cross-sectional view of trim cover members showing a state where two of the trim cover members of a car seat related to a third embodiment of the present invention are sewn by an apparel sewing machine in a state of superposing a tape along a portion where the trim cover members spread with overlapping being torn off are sewn up with each other after being superposed and sewn up with each other.

As a step corresponding to the step for executing the chain stitch sewing 50 explained using FIG. 6 in the first embodiment, as shown in FIG. 13, in a state where trim cover members 2102 (3102) and 2202 (3202) sewn up with each other are opened to the left and right, a tape 551 is superposed along the sewn-up portion. There is shown a state where this tape 551 and the trim cover members 2102 (3102) and 2202 (3202) are chain-stitch-sewn using a lock (chain stitch) sewing machine that sews knit raw material and the like using a plural number of needles and a plural number of threads, the trim cover members 2102 (3102) and 2202 (3202) sewn up with each other and opened to the left and right. The tape 551 is formed of leather, needle work, woven fabric, non-woven fabric, resin, and the like.

In FIG. 13, the reference sign 610 expresses a mechanism including a pressing tool 611 and a needle 621 of a lock sewing machine. Further, although a configuration of including four of the needles 621 is shown in FIG. 13, the number of the needles 621 is not limited to it, and a plurality of the needles 621 have only to be provided and they may be two for example.

By lifting and lowering the pressing tool 611 and four of the needles 621 while sending out the trim cover members 2102 (3102) and 2202 (3202) opened to the left and right around the sewn-up portion by a feed mechanism of a lock sewing machine not illustrated, fashionable chain stitch sewing (flat-quad stitch) can be executed by a needle thread 531, a bobbin thread 532, and warp threads 511, 512, 513, 514. Thus, decorativeness can be added to the sewn-up portion of the trim cover member. Here, a hot-melt thread is used as the bobbin thread 532. This hot-melt thread is formed of such material that its outer peripheral portion is molten excepting the center portion of the thread when the heat is applied.

By opening the trim cover members 2102 (3102) and 2202 (3202) sewn up with each other to the left and right and executing chain stitch sewing (flat-quad stitch) in a state of superposing the tape 551 along the sewn-up portion, even when rolling or bending may occur in a sewn-up portion of the trim cover members 2102 (3102) and 2202 (3202), rolling or bending can be hidden by the tape 551. Thus, the quality of appearance of a portion where chain stitch sewing (flat-quad stitch) is executed can be kept constant.

Here, when the distance from the lockstitch sewing portion 41 to the end 40 is too long, the portion from the lockstitch sewing portion 41 to the end 40 comes to protrude long downward. When the trim cover members 2102 (3102) and 2202 (3202) sewn up with each other are opened to the left and right in such state and are set to an apparel sewing machine, the sewn-up portion 24 (34: refer to FIG. 5) protrudes high beyond the portion of the trim cover members 2102 (3102) and 2202 (3202) in the periphery of the sewn-up portion 24 (34). As a result, chain stitch sewing by an apparel sewing machine cannot be executed normally, and the possibility of becoming a defective product increases.

In order to prevent occurrence of such circumstance, it is preferable to set the distance from the end 40 to the lockstitch sewing portion 41 to 1.5±1 mm similarly to the case of the first embodiment. Thus, flat-quad stitch working where the chain-stitch-sewn portion is comparatively flat compared to its peripheral portion can be executed.

Although the embodiment described above has been explained with respect to an example of application to the seat cushion 2 and the seatback 3, the embodiment described above can also be applied to other portions namely a headrest and an armrest for example not illustrated.

According to the present embodiment, it is possible to subject such thick fabrics as a vehicular trim cover to fashionable chain stitch sewing, and to add decorativeness to the sewn-up portion of the trim cover.

In addition, according to the present embodiment, it is possible to provide a car seat formed with a flat seam where the flat surface of the urethane pad is covered by the trim cover whose sewn-up portion is provided with decorativeness without forming a concave surface in the urethane pad that is a cushion member of a backing.

Although the invention achieved by the present inventor has been explained above specifically based on the embodiments, it is needless to mention that the present invention is not limited to the embodiments described above and can be changed variously within a range not deviating from its gist.

For example, the embodiments described above have been explained in detail in order to facilitate understanding of the present invention, and the present invention is not necessarily limited to one that includes all configurations explained. Further, with respect to a part of the configuration of each embodiment, it is possible to effect addition of other configurations, deletion, and replacement.

The invention claimed is:

1. A car seat configured to cover a surface of a urethane pad by a trim cover,
   wherein the trim cover is formed by sewing up a plurality of trim cover members with each other by lockstitch sewing and by chain stitch sewing along the lockstitch sewn portion,
   wherein a hot-melt thread whose surface is covered by hot-melt is used as a bobbin thread in the portion where the plurality of the trim cover members are sewn up with each other by chain stitch sewing, and
   wherein a surface on the back side of a portion where the plurality of the trim cover members are sewn up with each other by chain stitch sewing is joined to a flat surface of the surface of the urethane pad by heating and melting the hot-melt of the hot-melt thread.

2. The car seat according to claim 1, wherein the lockstitch sewing is treated at a portion of 1.5±1 mm from respective ends of the plurality of the trim cover members.

3. A car seat configured to cover a surface of a urethane pad by a trim cover,
   wherein portions in the vicinity of ends of a plurality of trim cover members are joined to each other by lockstitch sewing in the trim cover, and
   the plurality of trim cover members are sewn up with each other by chain stitch sewing along a portion joined by the lockstitch sewing in a state of being opened to the left and right around the portion joined by the lockstitch sewing in the trim cover.

4. The car seat according to claim 3, wherein the plurality of the trim cover members are sewn up with each other by the chain stitch sewing including a tape in a state of being covered by the tape along the portion joined by the lockstitch sewing in a state of being opened to the left and right around the portion joined by the lockstitch sewing in the trim cover.

5. The car seat according to claim 4, wherein a surface on the back side of a portion where the plurality of the trim cover members are sewn up with each other by the chain stitch sewing is joined to a flat surface of the surface of the urethane pad by an adhesive.

6. The car seat according to claim 4, wherein the plurality of the trim cover members of the trim cover are sewn up with each other by the lockstitch sewing at a portion of 1.5±1 mm from respective ends of the plurality of the trim cover members.

7. The car seat according to claim 3, wherein a surface on the back side of a portion where the plurality of the trim cover members are sewn up with each other by the chain stitch sewing is joined to a flat surface of the surface of the urethane pad by an adhesive.

8. The car seat according to claim 3, wherein the plurality of the trim cover members of the trim cover are sewn up with each other by the lockstitch sewing at a portion of 1.5±1 mm from respective ends of the plurality of the trim cover members.

\* \* \* \* \*